US008811180B2

(12) United States Patent
Ozawa

(10) Patent No.: US 8,811,180 B2
(45) Date of Patent: Aug. 19, 2014

(54) COMMUNICATION APPARATUS AND COMMUNICATION METHOD

(75) Inventor: Takeshi Ozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 843 days.

(21) Appl. No.: 13/018,232

(22) Filed: Jan. 31, 2011

(65) Prior Publication Data
US 2011/0194568 A1 Aug. 11, 2011

(30) Foreign Application Priority Data

Feb. 8, 2010 (JP) ................................. 2010-025865

(51) Int. Cl.
H04L 12/26 (2006.01)
(52) U.S. Cl.
USPC ........................................................ 370/236
(58) Field of Classification Search
USPC ........... 370/230, 231, 235, 236, 236.1, 236.2; 714/748–749
See application file for complete search history.

(56) References Cited

U.S. PATENT DOCUMENTS

2002/0004841 A1 1/2002 Sawatari
2002/0168945 A1* 11/2002 Hwang et al. .................... 455/69
2002/0194361 A1* 12/2002 Itoh et al. ...................... 709/233
2005/0005020 A1* 1/2005 Rey et al. ...................... 709/231
2006/0018257 A1* 1/2006 Seo ................................ 370/232
2006/0174023 A1* 8/2006 Horn et al. .................... 709/231
2007/0191024 A1* 8/2007 Kim et al. .................. 455/456.2
2008/0175195 A1* 7/2008 Cho et al. ...................... 370/329
2009/0103498 A1* 4/2009 Nilsson et al. ................ 370/336
2011/0211504 A1* 9/2011 Feuersanger et al. ......... 370/310

FOREIGN PATENT DOCUMENTS

JP 2001-320440 A 11/2001
JP 2004-072720 A 3/2004
JP 2004-112113 A 4/2004
JP 2004-343698 A 12/2004

* cited by examiner

Primary Examiner — Jeffrey M Rutkowski
(74) Attorney, Agent, or Firm — Canon U.S.A., Inc. IP Division

(57) ABSTRACT

A reception unit of a transmission apparatus receives reception status information indicating reception status of data by the reception apparatus, from a reception apparatus. Then, a rate control unit controls transmission rate of data to the reception apparatus, according to received reception status information. A transmission control unit controls transmission of the reception status information indicating reception status of data by the reception apparatus that is currently receiving data, according to the received reception status information.

17 Claims, 11 Drawing Sheets

FIG. 3A

```
TIMING DESIGNATON TYPE: INTERVAL TYPE
NEXT TRANSMISSION TIME: 1 2 3 0 1 5 0 0
INTERVAL              : 1 5 0 0
```

FIG. 3B

```
TIMING DESIGNATION TYPE: INTERVAL TYPE
NEXT TRANSMISSION TIME: NON
INTERVAL              : 4 0 0 0
```

FIG. 3C

```
TIMING DESIGNATION TYPE: TIME LISTING TYPE
LISTING NUMBER   : 5
TRANSMISSION TIME: 1 2 3 0 1 2 0 0
                   1 2 3 0 2 0 0 0
                   1 2 3 0 2 8 0 0
                   1 2 3 0 3 6 0 0
                   1 2 3 0 4 4 0 0
```

FIG. 3D

```
TIMING DESIGNATION TYPE: NO DESIGNATION
NEXT TRANSMISSION TIME: NON
```

FIG. 5

| 501 | 502 | 503 | 504 | |
|---|---|---|---|---|
| SESSION NUMBER | PREVIOUS TRANSMISSION TIME (msec) | TIMING DESIGNATION TYPE | TIMING DESIGNATION VALUE | |
| 1 | 12300300 | INTERVAL TYPE | (INTERVAL) 2500 | 12301300 | 12302100 | 12303100 |
| 2 | 12300400 | TIME LISTING TYPE | (NEXT TRANSMISSION TIME) 12302800 (NUMBER OF LISTINGS) 3 | 12301300 | 12302100 | 12303100 |

FIG. 10

| SESSION NUMBER | TIMING DESIGNATION TYPE | TIMING DESIGNATION VALUE | |
|---|---|---|---|
| | | INTERVAL VALUE 33 | (PREVIOUS TRANSMISSION TIME) 12301000 | (NEXT TRANSMISSION TIME) 12301033 |
| 1 | INTERVAL TYPE | | |
| 2 | WAITING TIME DESIGNATION TYPE | WAITING TIME 10 | |

1001　1002　1003

COMMUNICATION APPARATUS AND COMMUNICATION METHOD

BACKGROUND OF THE INVENTION

1. Field of the Invention

The present invention relates to a communication method of data.

2. Description of the Related Art

In recent years, transmission and reception of moving image data via a network have sharply increased. A real-time transport protocol (RTP) is generally used as a technology for stream transmission of the moving image data in real time through a network such as the Internet or a local area network (LAN).

Further, transmission and reception of information relating to the moving image stream transfer are performed in parallel with a stream transfer through the RTP, between a transmission apparatus and a reception apparatus, which respectively transmits and receives the moving image stream using the RTP. A real-time transport control protocol (RTCP) is often used for the transmission and reception of the information relating to the moving image stream transfer.

RTCP data, which the reception apparatus transmits to the transmission apparatus, includes reception status information (receiver report), a retransmission request for a packet which the reception apparatus has failed to receive, and the like. On the other hand, RTCP data, which the transmission apparatus transmits to the reception apparatus, includes a sender report and the like.

The reception status information includes, for example, a missing ratio of the received packets by the reception apparatus and a packet interval jitter. The transmission apparatus can adjust transmission rates of the moving image data, and rates of forward error correction (FEC) data, based on the reception status information received from the reception apparatus.

Japanese Patent Application Laid-Open No. 2001-320440 discusses, based on data loss ratio information from a transmission destination of data, controlling transmission rates of the data by the transmission apparatus since then. However, there is a possibility that appropriate communication control cannot be performed, depending on a transmission timing of the reception status information by the reception apparatus.

For example, if a transmission interval of the reception status information by the reception apparatus is long, the reception apparatus cannot respond quickly to a change of the communication status of the network. That is, even when congestion occurs on the network, there is a possibility that a start of processing for lowering the transmission rate will be delayed due to its delayed detection.

On the other hand, if the transmission interval of the reception status information by the reception apparatus is short, there is a possibility that a load imposed on transmission and reception of the reception status information and a traffic of the network will become larger more than necessary.

SUMMARY OF THE INVENTION

The present invention is directed to a communication apparatus and a communication method capable of performing appropriate communication control, when data is transmitted to a reception apparatus.

According to an aspect of the present invention, a communication apparatus that transmits data to a reception apparatus via a network by a transmission unit includes a reception unit configured to receive reception status information indicating reception status of data by the reception apparatus from the reception apparatus, a rate control unit configured to control transmission rate of data to the reception apparatus, according to the reception status information received by the reception unit, and a transmission control unit configured to control transmission of the reception status information by the reception apparatus which is currently receiving data from the transmission unit, according to the reception status information received by the reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of transmission timing designation of reception status information.

FIG. 5 is a table illustrating a storage example of information relating to transmission timings of the reception status information in the reception apparatus.

FIG. 10 illustrates a storage example of retransmission request timing designating information in the reception apparatus.

DESCRIPTION OF THE EMBODIMENTS

Various exemplary embodiments, features, and aspects of the invention will be described in detail below with reference to the drawings.

Configurations illustrated in the exemplary embodiments described below are only an example, and the present invention is not limited to the illustrated configuration.

In the present exemplary embodiment, an example in which a transmission apparatus of moving image data controls transmission of the reception status information by a reception apparatuses, according to the reception status information (receiver report: RR) from the reception apparatuses, will be described. The reception status information is information indicating reception status of data by the reception apparatuses.

In the present exemplary embodiment, an example in which the transmission apparatus transmits the moving image data to the reception apparatuses via the network will be described, but the data to be transmitted is not limited to the moving image data.

Figure 1:
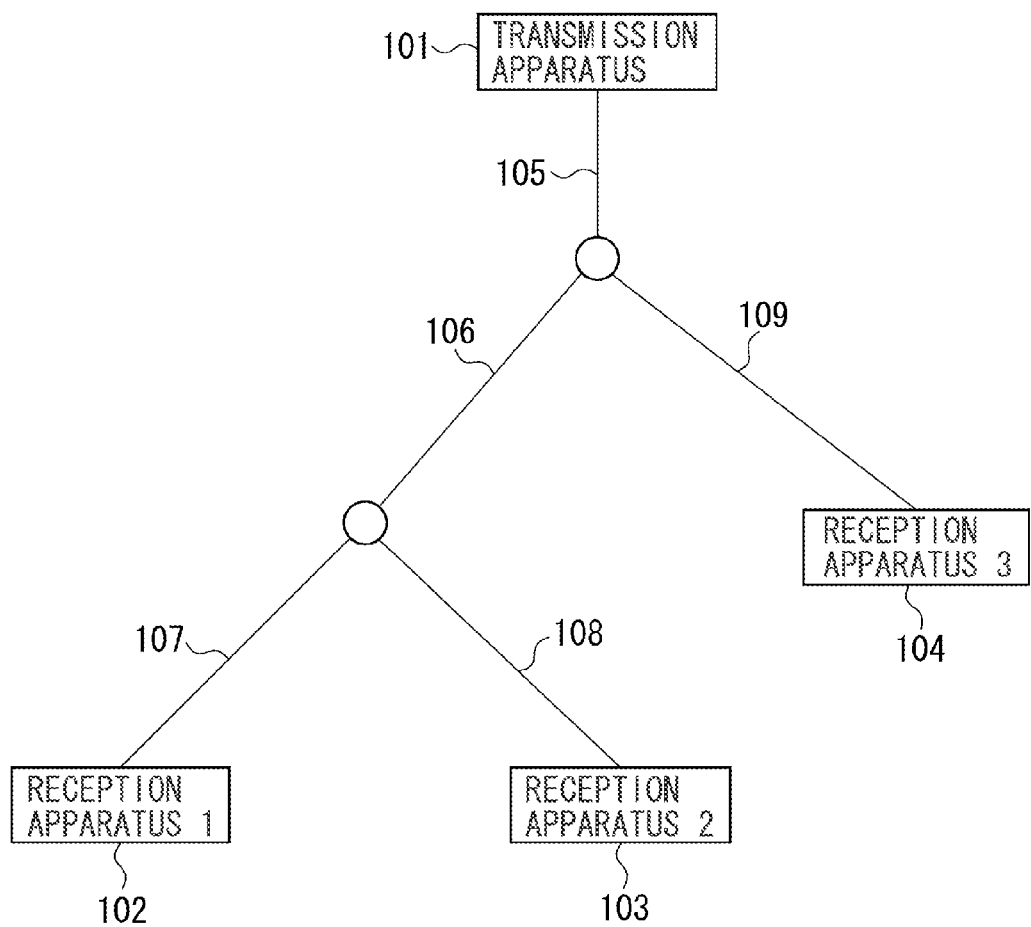
FIG. 1 is a network configuration diagram including a transmission apparatus and reception apparatuses.

FIG. 1 is a configuration diagram of the entire system including the transmission apparatus and the reception apparatuses according to the present exemplary embodiment.

A transmission apparatus 101 having a streaming function of the moving image data is connected to reception apparatuses 102 to 104 via the network. The transmission apparatus 101 serves as a moving image streaming server which transmits the moving image data to each reception apparatus. The transmission apparatus 101 transmits moving image data and FEC data for the moving image data in an RTP packet. Each reception apparatus can restore a moving image packet that could not be normally received, using a normally received moving image packet, and a normally received FEC packet.

In the present exemplary embodiment, an example in which the transmission apparatus 101 transmits the moving image data in different sessions to each reception apparatus will be described. The transmission apparatus 101 receives reception status information indicating reception status of data from each reception apparatus.

The transmission apparatus 101 controls transmission rates of the moving image data, according to the reception status information from each reception apparatus, and transmits a packet (transmission control packet) for controlling transmission of the reception status information using the RTCP packet, to each reception apparatus. In addition, the transmission apparatus 101, upon receiving a retransmission request from the reception apparatus, retransmits a requested moving image packet.

The reception apparatuses 102 to 104 are clients which receive the moving image data from the transmission apparatus 101. Each reception apparatus transmits the reception status information indicating the reception status of the moving image data and retransmission request for a moving image packet that could not be received, to the transmission apparatus 101 using the RTCP packet.

Communication paths 105 to 109 are, actually, constituted by various communication channels and relaying devices. For example, the communication path 108 is constituted by a combination of wireless communication path and wired communication path. Network bands and packet loss ratios from the transmission apparatus 101 to each reception apparatus are different from one another. Also, packet loss ratios and available network bands from the transmission apparatus 101 to each reception apparatus temporally fluctuate respectively.

Figure 2:
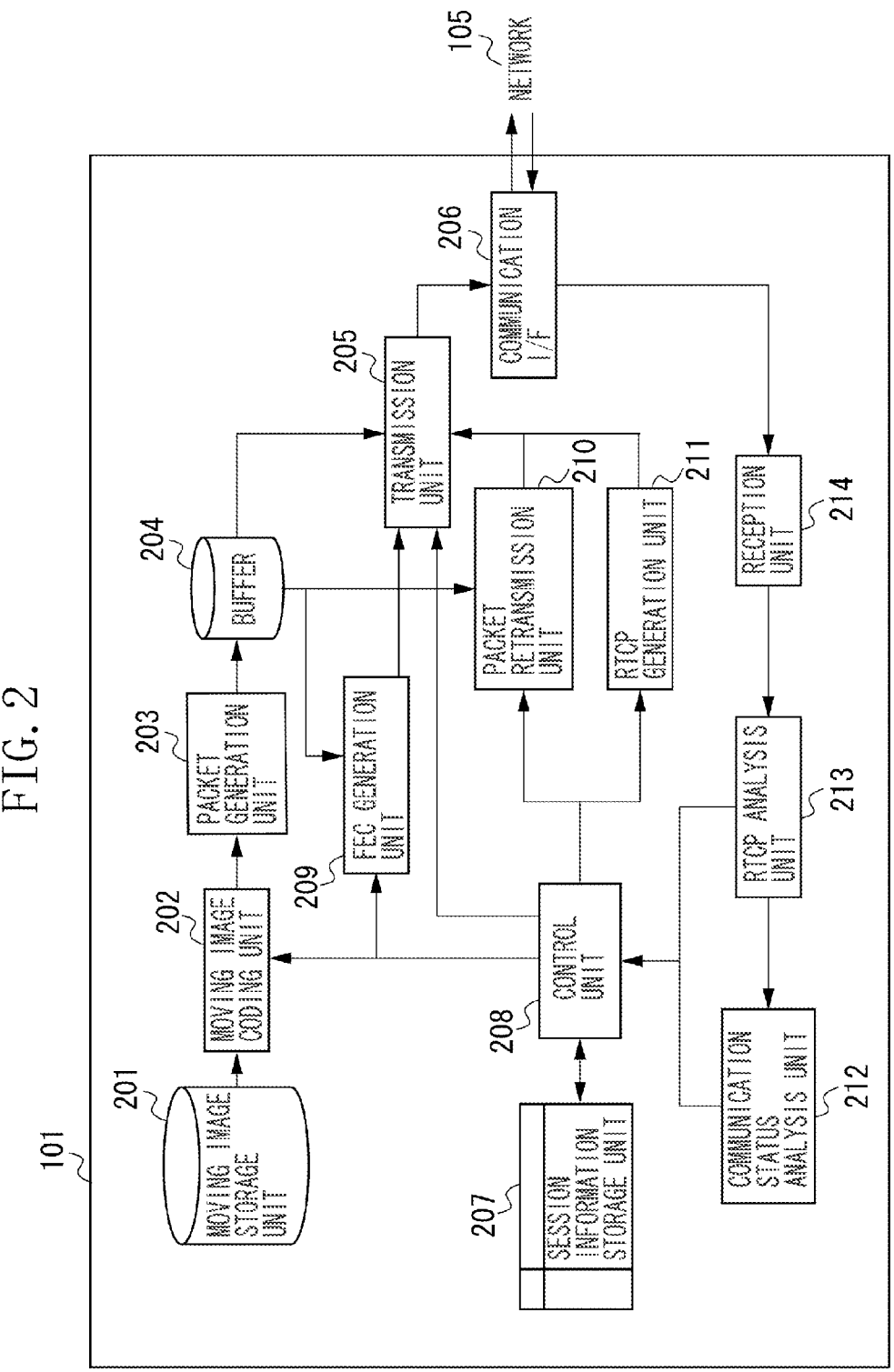
FIG. 2 is a functional configuration diagram of the transmission apparatus.

FIG. 2 is a block diagram illustrating a functional configuration of the transmission apparatus 101 according to the present exemplary embodiment. The transmission apparatus 101 includes a moving image storage unit 201, a moving image coding unit 202, a packet generation unit 203, a buffer 204, a transmission unit 205, and a communication interface 206. The transmission apparatus 101 further includes a session information storage unit 207, a control unit 208, an FEC generation unit 209, a packet retransmission unit 210, an RTCP generation unit 211, a communication status analysis unit 212, an RTCP analysis unit 213, and a reception unit 214.

The transmission apparatus 101 is connected to the communication path 105 via the communication interface 206. The moving image coding unit 202 performs coding of the moving image data in the moving image storage unit 201, according to an instruction of coding rate given by the control unit 208. The packet generation unit 203 converts the moving image data which has been already coded by the moving image coding unit 202, into packet data for network transmission, and stores it in the buffer 204.

The FEC generation unit 209 generates FEC packets from the moving image packets stored in the buffer 204, according to an instruction of an FEC rate given by the control unit 208, and outputs it to the transmission unit 205. The FEC rate is a number of packets of the FEC packets relative to a number of packets of the moving image data.

The transmission unit 205 transmits the moving image packets and the FEC packets to each reception apparatus recorded in the session information storage unit 207, according to an instruction from the control unit 208.

The reception unit 214 receives the RTCP packets from each reception apparatus that is the transmission destination of the moving image data, and outputs them to the RTCP analysis unit 213. The RTCP packets which the reception unit 214 receives from the reception apparatuses include reception status information and retransmission request packets. The RTCP analysis unit 213 outputs the retransmission request packets to the control unit 208, and outputs the reception status information to the communication status analysis unit 212.

The control unit 208 that has received the retransmission request packet from the RTCP analysis unit 213, causes the transmission unit 205 to transmit the moving image packet requested for retransmission. Further, the communication status analysis unit 212 that has received the reception status information from the RTCP analysis unit 213, calculates parameters of the communication status from the reception status information, and notifies the control unit 208.

The reception status information according to the present exemplary embodiment includes a total number of packets indicating a sum of numbers of the moving image packets and the FEC packets transmitted from the start of the session, and a total number of packets of error packets which the reception apparatus could not normally received. The communication status analysis unit 212 calculates an error ratio for each predetermined time period, based on the reception status information, and notifies the control unit 208.

The control unit 208 determines a transmission rate for the reception apparatus, based on the error ratio notified from the communication status analysis unit 212. Then, the control unit 208 instructs a coding rate of the moving image data to the moving image coding unit 202, based on the determined transmission rate, and instructs the FEC rate to the FEC generation unit 209.

In addition, the control unit 208 determines transmission timings of the reception status information by the reception apparatus. Then, the control unit 208 requests the RTCP generation unit 211 to generate the RTCP packet (transmission control packet) for notifying the reception apparatus of the determined transmission timings of the reception status information, and causes the transmission unit 205 to transmit the generated transmission control packet to the reception apparatus.

More specifically, the control unit 208 controls transmission of the reception status information indicating the reception status of the data from the transmission unit 205 by the reception apparatus that is currently receiving the data from the transmission unit 205, according to the reception status information received by the reception unit 214.

FIG. 3 is an example of designated content of a transmission control packet which the transmission apparatus 101 transmits to the reception apparatus. FIG. 3A illustrates a type for designating a next transmission time, and a transmission interval since then. More specifically, the control unit 208 transmits an RTCP packet which designates the next transmission time of the reception status information, and the transmission interval since then to the reception apparatus, via the transmission unit 205.

In this example, the next transmission time (12301500 ms), and the transmission interval since then (1500 ms) are designated. The control unit 208 according to the present exemplary embodiment designates the transmission timings of the reception status information with time stamps of network time protocol (NTP).

FIG. 3B illustrates a type for designating only the transmission interval without designating the next transmission time. That is, the control unit 208 transmits the RTCP packet which designates a transmission interval of the reception status information to the reception apparatus, via the transmission unit 205. In this example, only the transmission interval (4000 ms) is designated.

FIG. 3C illustrates a type for designating the transmission time points from the next time by listing them. More specifically, the control unit 208 transmits the RTCP packet which designates a plurality of transmission time points of the reception status information, to the reception apparatus, via the transmission unit 205. In this example, five transmission time points are listed.

FIG. 3D illustrates a type for causing the reception apparatus to determine the transmission time points of the reception status information. More specifically, the control unit 208 transmits the RTCP packet which instructs the reception apparatus to decide transmission timings of the reception status information, to the reception apparatus, via the transmission unit 205.

Figure 4:
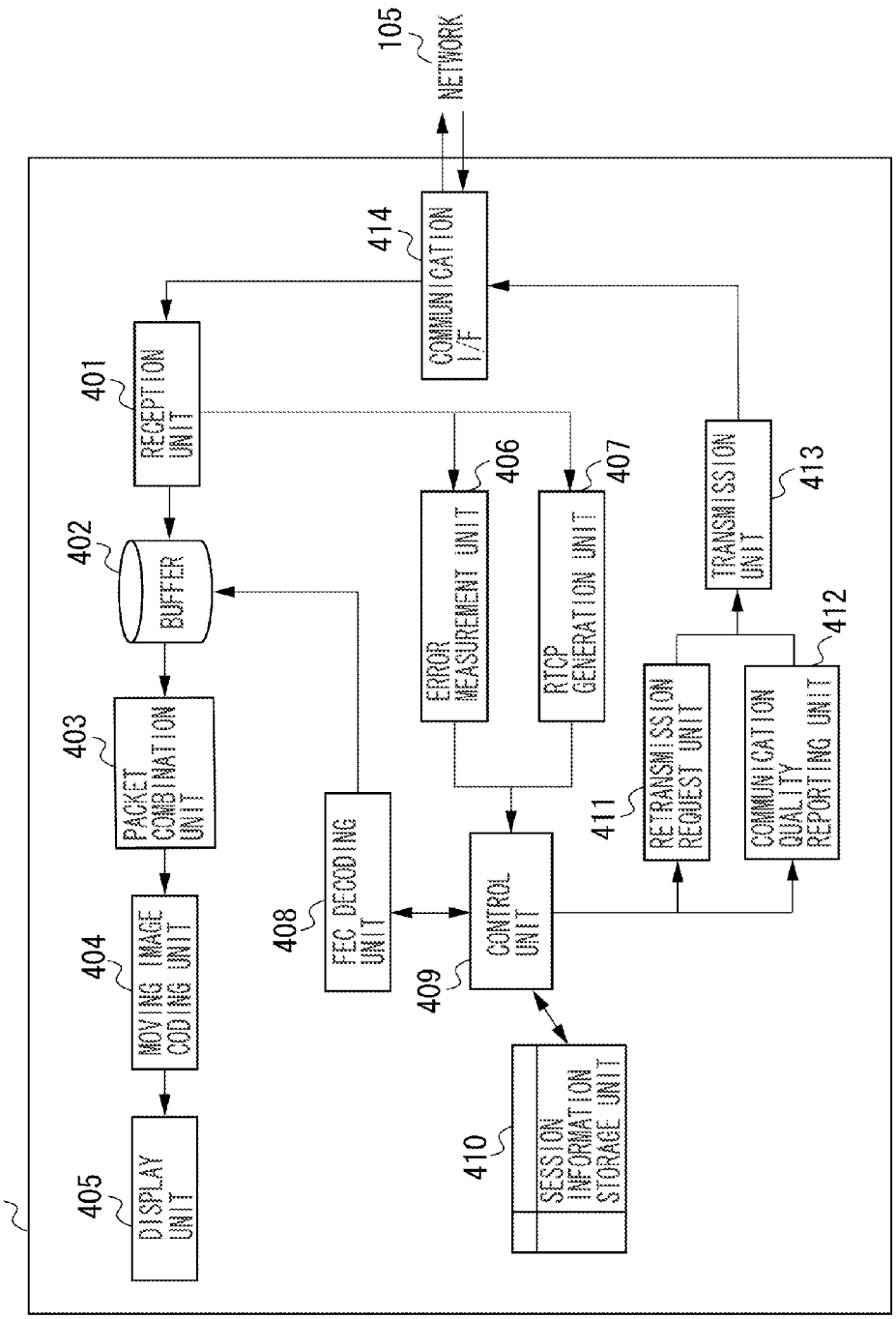
FIG. 4 is a functional configuration diagram of the reception apparatus.

FIG. 4 is a block diagram illustrating a functional configuration of the reception apparatuses 102 to 104 according to the present exemplary embodiment. The reception apparatus includes a reception unit 401, a buffer 402, a packet combination unit 403, a moving image decoding unit 404, a display unit 405, an error measurement unit 406, an RTCP analysis unit 407, and an FEC decoding unit 408.

In addition, the reception apparatus includes a control unit 409, a session information storage unit 410, a retransmission requesting unit 411, a communication quality reporting unit 412, a transmission unit 413, and a communication interface 414. The reception apparatus is connected to the communication path via the communication interface 414.

The reception unit 401 saves the moving image packets and the FEC packets received via the communication interface 414, in the buffer 402. The reception unit 401 outputs the received RTCP packets to the RTCP analysis unit 407.

The RTCP packet received in the present exemplary embodiment includes a transmission control packet (a packet for controlling transmission of the reception status information), and a retransmission request packet transmitted by another reception apparatus. The reception unit 401 notifies the error measurement unit 406 of a sequence number of the received moving image packet.

The packet combination unit 403 combines the moving image data of one or more moving image packets saved in the buffer 402, and output it to the moving image decoding unit 404. The moving image decoding unit 404 decodes the combined moving image data and outputs it to the display unit 405. The display unit 405 displays the decoded moving image data.

The error measurement unit 406 identifies a sequence number of an error packet from among the sequence numbers notified from the reception unit 401, and notifies the control unit 409 of the sequence number of the error packet.

The control unit 409 notifies the communication quality reporting unit 412 that an error packet has generated, according to a notification from the error measurement unit 406. Further, the control unit 409 determines whether the error packet is restorable, using a normally received moving image packet and FEC packet. The control unit 409 requests the FEC decoding unit to restore the error packet determined as restorable. Then, the control unit 409 notifies the retransmission requesting unit 411 of the sequence number of the error packet determined as non-restorable.

However, the control unit 409, if a retransmission request packet of the same packet as the error packet determined as non-restorable is received from another reception apparatus, does not notify the retransmission requesting unit 411 of the sequence number of the error packet.

Accordingly, the retransmission request packets of the same error packets can be prevented from being sent in duplicate. In the present exemplary embodiment, since each reception apparatus receives moving image data different from one another, all the error packets determined to be non-restorable are requested for retransmission.

The FEC decoding unit 408 searches the buffer 402 for the moving image packet and the FEC packet, which are needed for restoration of the error packet that is requested to restore from control unit 409, and restores them.

The retransmission requesting unit 411 creates an RTCP packet for requesting retransmission of the error packet, based on the sequence number notified from the control unit 409, and transmits it to the transmission apparatus 101 via the transmission unit 413.

The RTCP analysis unit 407 analyzes the received RTCP packet, and notifies the control unit 409 of an analysis result thereof. The RTCP analysis unit 407 according to the present exemplary embodiment analyzes a transmission control packet, and determines which type of FIGS. 3A to 3D it belongs to. Then, the RTCP analysis unit 407 notifies the control unit 409 of the transmission timings of the reception status information according to the type of the transmission control packets.

The control unit 409, which has received notification from the RTCP analysis unit 407, records the transmission timings of the reception status information in the session information storage unit 410.

FIG. 5 is an example of a management table for managing the transmission timings of the reception status information stored in the session information storage unit 410. As illustrated in FIG. 5, the management table is composed of a reception session number 501, a preceding transmission time 502, a transmission timing designation type 503, and a transmission timing designation value 504.

The reception apparatus according to the present exemplary embodiment manages the transmission timings of the reception status information for each session. For example, the reception apparatus 102 receives the first moving image data based on a session of a session number 1 from the transmission apparatus 101, and receive second moving image data based on a session of a session number 2, from a transmission apparatus different from the transmission apparatus 101.

In other words, the reception apparatus 102, which stores the management table illustrated in FIG. 5, transmits the reception status information to the transmission apparatus 101, when the transmission interval has reached 12302800 ms, and thereafter, transmits the reception status information at 2500 ms intervals.

The reception apparatus 102 transmits the reception status information to another transmission apparatus, when the transmission interval has reached 12301300 ms, and thereafter, transmits the next reception status information, upon having reached 12302100 ms.

The control unit 409 changes setting values stored in the session information storage unit 410, in response to notification from the RTCP analysis unit 407.

Figure 6:
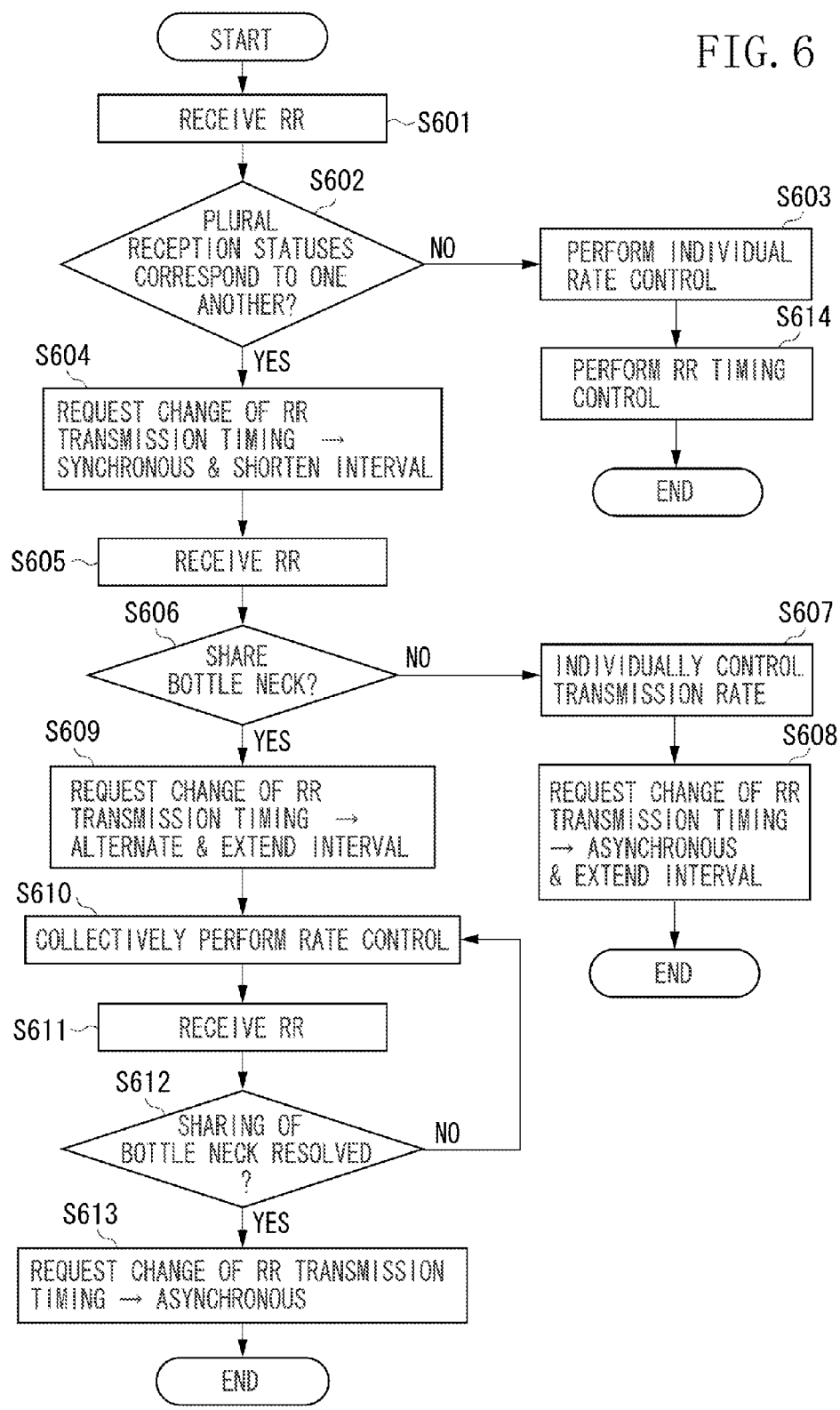
FIG. 6 is a flowchart illustrating processing in which the transmission apparatus controls transmission of the reception status information.

Next, processing of the transmission apparatus 101 which transmits the moving image data to the reception apparatuses 102 to 104, will be described with reference to FIG. 6. The processing of the flowchart of FIG. 6 is implemented by a central processing unit (CPU) executing a program stored in a read-only memory (ROM).

In step S601 (reception procedure), the communication status analysis unit 212 notifies the control unit 208 of an analysis result of the reception status information, in response to the fact that the reception unit 214 has received the reception status information from the reception apparatus.

In step S602, the control unit 208 determines whether the reception statuses of a plurality of reception apparatuses correspond to one another, based on an analysis result of the reception status information from the plurality of reception apparatuses. For example, the control unit 208 determines whether the reception status (e.g., an error ratio), which the first and the second reception status information indicate, corresponds to each other, in the case of having received the second reception status information from the reception apparatus 103, within a predetermined time after having received the first reception status information from the reception apparatus 102.

Moreover, the control unit 208 determines whether a reception status, which third reception status information indicates, received from the reception apparatus 102 after receiving the second reception status information, and a reception status which fourth reception status information indicates, received from the reception apparatus 103 within a predetermined time after receiving the third reception status information, corresponds to each other.

Then, if it is determined that the reception statuses, which the first and the second reception status information indicates, correspond to each other, and the reception statuses, which the third and the fourth reception status information indicates, correspond to each other, the control unit 208 determines that the reception statuses of the reception apparatuses 102 and 103 correspond to each other.

In step S602, if it is determined that the reception statuses of a plurality of reception apparatuses correspond to each other (YES in step S602), then the processing proceeds to step S604. If it is determined that the reception statuses do not correspond to each other (NO in step S602), then the processing proceeds to step S603. In a case where the transmission apparatus 101 transmits data to only one reception apparatus, then the processing proceeds to step S603.

In step S603 (rate control procedure), the control unit 208 determines a transmission rate to the reception apparatus, according to an analysis result of the reception status information received in step S601. For example, the control unit 208 lowers the transmission rate, if an error ratio is higher than a predetermined error ratio, and raises the transmission rate, if an error has not occurred, and the transmission rate has not reached a target rate.

In step S614 (transmission control procedure), the control unit 208 causes the RTCP generation unit 211 to generate a packet (transmission control packet) for controlling transmission of the reception status information, according to the analysis result of the reception status information received in step S601. Then, the control unit 208 transmits the generated transmission control packet to the reception apparatus via the transmission unit 205.

The control unit 208 according to the present embodiment lowers the transmission rate, if the error ratio is higher than the predetermined error ratio, and performs control so that the reception apparatus transmits the reception status information, at an earlier timing and at a shorter interval than the case where the error ratio is lower than the predetermined error ratio. More specifically, the control unit 208 causes the next reception status information to be transmitted at an earlier timing than the case where the reception status information indicates a second reception status (a second error ratio), when the reception status information indicates a first reception status (a first error ratio).

Further, the control unit 208 causes reception status information indicating a reception status at a first time period to be transmitted when the reception status information indicates the first reception status, and causes reception status information indicating a reception status at a second time period shorter than the first time period to be transmitted when the reception status information indicates the second reception status. The error ratio (the second error ratio) of the second reception status has less error data than the error ratio (the first error ratio) of the first reception status.

Further, the control unit 208, if an error ratio is lower than the predetermined error ratio, and a transmission rate has not reached the target rate, raises the transmission rate, and performs control so that the reception apparatus transmits the next reception status information at an earlier timing than that in the case without the control.

More specifically, the control unit 208, if the transmission rate is raised based on error information which the reception status information indicates, performs control so that the reception apparatus transmits the next reception status information at an earlier timing than that in the case where the transmission rate is not raised. The reception status information is transmitted at the early timing, thereby the transmission apparatus 101 can know the communication status earlier.

Further, the control unit 208, if the error ratio is lower than the predetermined error ratio, and the transmission rate has reached the target rate, does not change the transmission rate, and perform control so that the reception apparatus transmits the next reception status information at a later timing than that in the case without the control.

In this case, the control unit 208 performs control so that the transmission intervals of the reception status information at the next time and later becomes longer. By reducing a number of times of transmissions of the reception status information, a load imposed on transmission and reception of the reception status information and a load of the network can be reduced.

If it is determined that the reception statuses of the reception apparatuses 102 and 103 correspond to each other in step S602 (YES in step S602), then in step S604, the control unit 208 causes the reception apparatuses 102 and 103 to transmit the reception status information which indicates the reception statuses during the matching time period.

For example, the control unit 208 causes the RTCP generation unit 211 to generate a transmission control packet which designates a next transmission time of 12303500 ms, and an interval of 1000 ms, and causes the RTCP generation unit 211 to transmit to each of the reception apparatuses 102 and 103. Accordingly, the reception apparatuses 102 and 103 will transmit the reception status information at the same timing.

More specifically, the control unit 208 causes the reception apparatus 102 which has transmitted the first reception status information, and the reception apparatus 103 which has transmitted the second reception status information of which the reception status corresponds to the first reception status information, to transmit the reception status information at the corresponding timing. The second reception status information is the reception status information received by the transmission apparatus 101 within a predetermined time after receiving the first reception status information.

In step S604, the control unit 208 renders a transmission interval of the reception status information shorter than that before causing the reception apparatuses 102 and 103 to transmit the reception status information at the matching time period. With the above processing, comparison between the reception statuses of the reception apparatuses 102 and 103 can be performed with better accuracy.

In the present exemplary embodiment, there has been described an example in which the reception status information at the matching time period is transmitted, if it is determined that the reception statuses correspond to each other in step S602. Instead, it is also possible to transmit the reception status information at the matching time period, without performing determination in step S602.

In step S605, the control unit 208 receives the reception status information at the matching time period from the plurality of reception apparatuses 102 and 103.

In step S606, the control unit 208 determines whether the a plurality of reception apparatuses 102 and 103 share a bottle neck, based on the reception status information received in step S605. More specifically, the control unit 208 receives a plurality of pieces of the reception status information at the matching time period, from each of the plurality of reception apparatuses 102 and 103, and determines whether fluctuations of these error ratios correspond to each other.

For example, according to the reception status information from the reception apparatuses 102 and 103, if the error ratios of the reception apparatus 102 and 103 coincide with each other, in the error ratios at the first time period of 5%, the error ratios at the second time period of 7%, and the error ratios at the third time period of 10%, it is determined that the reception apparatuses 102 and 103 share the bottle neck.

For example, when the error ratios at the first and the second time periods coincide with each other, and the error ratio at the third time period has a difference of 1%, it is determined that the reception apparatuses 102 and 103 share the bottle neck.

In step S606, if it is determined that the plurality of reception apparatuses 102 and 103 share the bottle neck (YES in step S606), then the processing proceeds to step S609. If it is determined that the reception apparatuses 102 and 103 do not share the bottle neck (NO in step S606), then the processing proceeds to step S607.

In step S607, the control unit 20 controls transmission rates of data, based on an analysis result of the reception status information received from each reception apparatus, similar to the processing in step S603. More specifically, the control unit 208 controls the transmission rates of the data to the reception apparatus 102 based on the reception status information from the reception apparatus 102, and controls the transmission rates of the data to the reception apparatus 103 based on the reception status information from the reception apparatus 103.

Then, in step S608, the control unit 208 causes the reception apparatuses 102 and 103 to transmit the reception status information at different timings from each other, and renders the transmission intervals of the reception status information longer. In this way, the reception status information from the reception apparatuses which have been determined as not sharing the bottle neck, are transmitted at different timings. As a result, the control of the transmission rates and the load of the network can be temporally leveled out, compared with the case of receiving at the same time the reception status information from the plurality of the reception apparatuses.

In step S609, the control unit 208 causes the reception apparatuses 102 and 103 to alternately transmit the reception status information. More specifically, if the pieces of reception status information, which are transmitted by the reception apparatuses 102 and 103 at the matching timing, corresponds to each other, the control unit 208 causes the reception apparatuses 102 and 103 to alternately transmit the reception status information.

For example, the control unit 208 causes the RTCP generation unit 211 to generate a first transmission control packet which designates a next transmission time of 12308500 ms, and an interval of 2000 ms, and causes the RTCP generation unit 211 to transmit it to the reception apparatus 102. In addition, the control unit 208 causes the RTCP generation unit 211 to generate a second transmission control packet which designates, for example, a next transmission time of 12309500 ms, and an interval of 2000 ms, and causes the RTCP generation unit 211 to transmit it to the reception apparatus 103.

The control unit 208 causes the reception apparatuses 102 and 103 to transmit the reception status information, each at 1000 ms interval, in step S604.

The reception apparatus 102 which has received the first transmission control packet from the transmission apparatus 101, transmits the reception status information to the transmission apparatus 101 at time points 12308500, 12310500, 12312500, . . . . Also, the reception apparatus 103 which has received the second transmission control packet from the transmission apparatus 101, transmits the reception status information to the transmission apparatus 101, at time points of 12309500, 12311500, 12313500, . . . .

More specifically, the control unit 208 renders a transmission interval of the reception status information by the reception apparatus 102, and a transmission interval of the reception status information by the reception apparatus 103, longer than those before causing the reception apparatuses 102 and 103 to alternately transmit the reception status information.

In this way, the transmission apparatus 101 causes the reception apparatuses 102 and 103 to alternately transmit the reception status information, and renders the transmission intervals longer. With the above processing, the transmission apparatus 101 can confirm a communication status of the bottle neck at a short interval (every 1000 ms), while reducing a load of transmission and reception of the reception status information, and a load of the network.

In step S610, the control unit 208 collectively controls transmission rates of the data to the reception apparatuses 102 and 103, based on the reception status information alternately transmitted from the reception apparatuses 102 and 103. For example, the control unit 208 acquires priority degrees that have been set for each of the reception apparatuses 102 and 103 that have been determined to share the bottle neck.

Then, the control unit 208 determines a total value of the transmission rates, according to the reception statuses of the reception apparatuses 102 and 103, and further determines the first transmission rate to the reception apparatus 102, and the second transmission rate to the reception apparatus 103 respectively, according to the priority degrees of the reception apparatuses 102 and 103.

Accordingly, the transmission rate to the reception apparatus 102 which has a higher priority degree than that of the reception apparatus 103, out of the reception apparatuses 102 and 103 which share the bottle neck, is determined to be higher than that of the reception apparatus 103.

In step S612, the control unit 208 determines whether the reception apparatuses 102 and 103 share the bottle neck, based on the reception status information alternately transmitted from the reception apparatuses 102 and 103. More specifically, the communication status analysis unit 212 calculates fluctuations of the error ratios, based on the reception status information from each reception apparatus, and notifies the control unit 208.

Then, the control unit 208 determines whether the reception apparatuses 102 and 103 share the bottle neck, based on a calculation result by the communication status analysis unit 212. This determination is performed similarly to the processing of step S606.

In step S612, if it is determined that the reception apparatuses 102 and 103 share the bottle neck (NO in step S612), then the processing returns to step S610. The control unit 208 collectively controls the transmission rates of the reception apparatuses 102 and 103. On the other hand, if it is determined that the reception apparatuses 102 and 103 do not share the bottle neck (YES in step S612), then the processing proceeds to step S613. The control unit 208 causes the reception apparatuses 102 and 103 to transmit the reception status information at different timings.

In this way, by causing the reception apparatuses which do not share the bottle neck to transmit the reception status information at the different timings, a load of the network by the reception status information, and a load of transmission rate control according to the reception status information or the like can be temporally leveled out.

Figure 7:
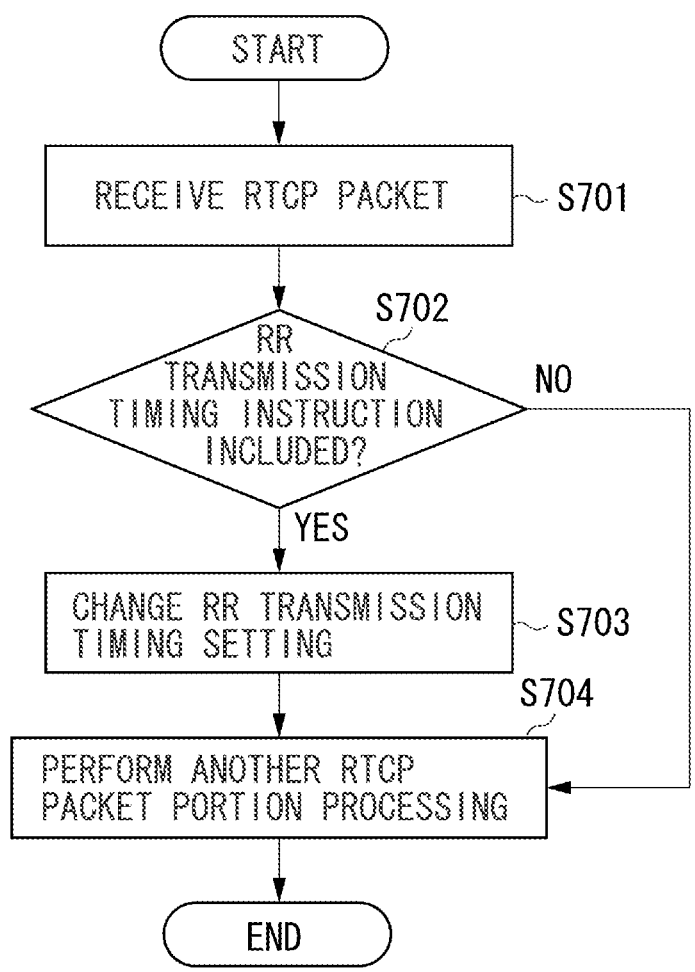
FIG. 7 is a flowchart illustrating processing in which the reception apparatus determines a transmission timing of the reception status information.

Next, processing in which the control unit 409 in each of the reception apparatuses 102 to 104 determines a transmission timing of the reception status information will be described with reference to the flowchart of FIG. 7.

In step S701 (reception procedure), the RTCP analysis unit 407 receives an RTCP packet from the transmission apparatus 101. Then, the RTCP analysis unit 407, if the RTCP packet is a transmission control packet, acquires a control signal for controlling the transmission timing of the reception status information and notifies the control unit 409.

The fact that the RTCP analysis unit 407 receives the transmission control packet in step S701, represents that at least one or more pieces of reception status information have been transmitted to the transmission apparatus 101, before then (transmission procedure).

In step S702, the control unit 409 determines whether information notified from the RTCP analysis unit 407 in step S701 is a control signal for controlling the transmission timing of the reception status information. If it is determined that information notified in step S701 is a control signal for controlling the transmission timing of the reception status information (YES in step S702), then the processing proceeds to step S703. If it is determined that the information is not a control signal for controlling the transmission timing of the reception status information (NO in step S702), then the processing proceeds to step S704.

In step S703 (control procedure), the control unit 409 changes setting of the transmission timing of the reception status information, based on the control signal notified in step S701.

The control unit 409, upon receiving the control signal including the content as illustrated in FIG. 3A, sets the next transmission time to a designated value, and sets the transmission interval of the reception status information. In other words, the control unit 409 rewrites information stored in the session information storage unit 410, as illustrated in FIG. 5, based on the notified control signal.

More specifically, the control unit 409 controls transmission of the reception status information indicating the reception status of the data received after receiving the control signal, in response to the control signal received after the reception status information has been transmitted.

In step S704, the control unit 409 performs processing other than the transmission timings of the reception status information, out of processing based on the received RTCP packets. For example, upon receiving a retransmission request packet as the RTCP packet, the control unit 409 performs retransmission processing of the packet in step S704.

Next, a second exemplary embodiment will be described centering on differences from the first exemplary embodiment. In the present exemplary embodiment, an example in which the transmission apparatus 101 which multicast-transmits the same moving image data to the reception apparatus 102 to 104, instructs the transmission timings of retransmission request to the reception apparatuses, will be described.

Configurations of the transmission apparatus 101 and the reception apparatuses 102 to 104 according to the present exemplary embodiment, are similar to those of the first exemplary embodiment. Moreover, the control unit 208 according to the present exemplary embodiment requests the RTCP generation unit 211 to create a retransmission request control packet. The control unit 208 transmits the retransmission request control packet generated by the RTCP generation unit 211 to the reception apparatus via the transmission unit 205.

The retransmission request control packet is a packet for designating a timing, at which the retransmission request can be transmitted to the reception apparatus. The reception apparatus, if a packet loss of the moving image data occurs, waits to transmit the retransmission request until the timing designated by the retransmission request control packet.

A method in which the control unit 208 according to the present exemplary embodiment designates the transmission timings of the retransmission request includes, for example, an interval type, a time listing type, and a waiting time designation type. In the interval type, a next transmission time (e.g., 12300010 ms) and an interval (e.g., 33 ms) are designated. In the time listing type, a number of listings (e.g., 5), transmission time points (12301010 ms, 12301043 ms, 12301076 ms, 12301109 ms, and 12301132 ms) are designated.

Further, in the waiting time designation type, a waiting time (e.g., 10 ms) is designated. The reception apparatus which has received a retransmission control packet of the waiting time designation type, waits 10 ms after detecting a packet loss of the moving image data to transmit a retransmission request packet to the transmission apparatus 101.

If the reception apparatus has received a retransmission request packet for a lost packet from another reception apparatus within the waiting time of 10 ms, the reception apparatus does not transmit the retransmission request packet. In the present exemplary embodiment, an example of specifying the transmission timings of the retransmission request using time tamps of NTP has been described, but another specifying method may be used.

Figure 8:
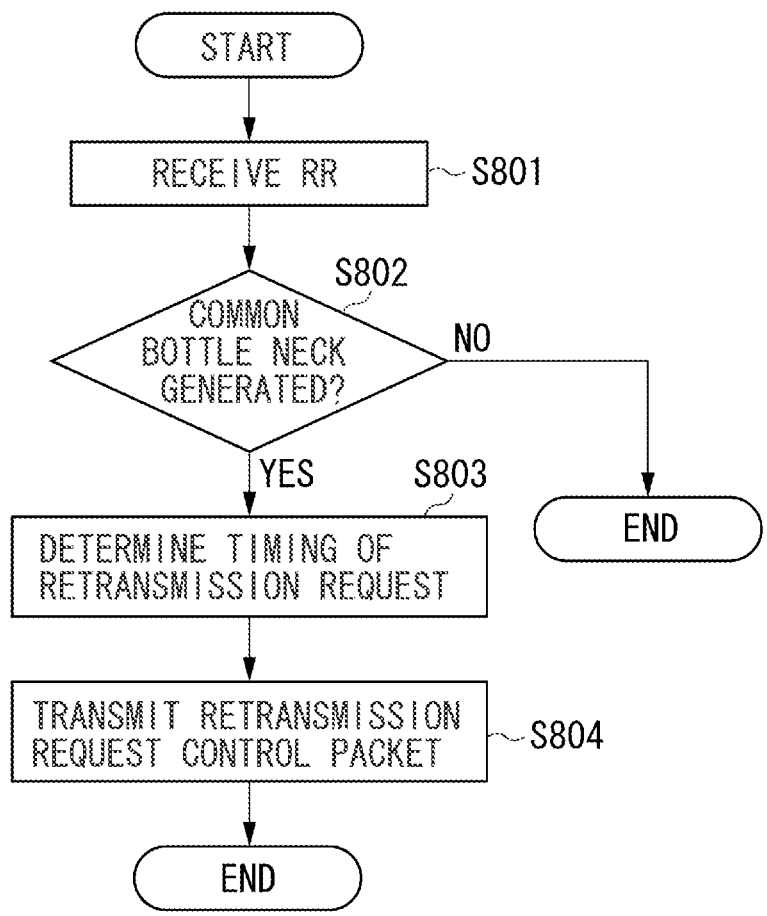
FIG. 8 is a flowchart illustrating processing for controlling a transmission timing of a retransmission request in the transmission apparatus.

Next, processing in which the control unit 208 according to the present exemplary embodiment controls the transmission timing of the retransmission request made by the reception apparatus, will be described with reference to FIG. 8.

In step S801, the control unit 208 receives an analysis result (e.g., an error ratio for each predetermined time period) calculated by the communication status analysis unit 212, based on the reception status information from each of the reception apparatuses 102 to 104.

In step S802, the control unit 208 determines whether each reception apparatus shares the bottle neck, based on the analysis result received in step S801. The processing in steps S801 and S802 corresponds to the processing in steps S601 to S606 of FIG. 6.

If it is determined that the reception apparatuses share the bottle neck in step S802 (YES in step S802), then the processing proceeds to step S803. If it is determined that the reception apparatuses do not share the bottle neck (NO in step S802), then the processing of the present exemplary embodiment is terminated. In this description, it is to be determined that the reception apparatuses 102 and 103, out of the reception apparatuses 102 to 104, share the bottle neck. The reception apparatuses 102 to 104 are transmission destinations of the moving image data through multicast by the transmission apparatus 101.

In step S803, the control unit 208 determines transmission timings of the retransmission requests by the reception apparatuses 102 and 103 which have been determined to share the bottle neck.

For example, the control unit 208, when performing control by the interval type, sets an interval of the reception apparatus having a higher processing capability to a smaller value, and an interval of the reception apparatus having a lower processing capability to a large value, out of the plurality of reception apparatuses which share the bottle neck. Accordingly, it is possible to cause the reception apparatus which has a higher processing capability to transmit as many retransmission requests as possible.

However, it is not limited to such a determination method of the interval, and the interval may be determined, based on the order of attending a multicast group, for example. Alternatively, the interval may be determined, based on priority degree of each reception apparatus, or designation by a user, for example.

In step S804, the control unit 208 requests the RTCP generation unit 211 to generate a retransmission request control packet for causing the reception apparatuses which share the bottle neck to transmit retransmission requests at the transmission timings determined in step S803.

Then, the control unit 208 causes the retransmission request control packet generated by the RTCP generation unit 211 to be transmitted to the reception apparatuses which share the bottle neck. More specifically, the control unit 208 designates timings at which retransmission requests of error data can be transmitted, to the reception apparatuses 102 and 103 of which the reception status information corresponds to each other, which are transmission destinations of the same data.

The control unit 208, when controlling, for example, by using the interval type, requests the RTCP generation unit 211 to generate a first transmission request control packet which designates a next transmission time of 12301000 ms, and an interval of 33 ms.

In addition, the control unit 208 requests the RTCP generation unit 211 to generate a second retransmission request control packet which designates a next transmission time of 12301015 ms, and an interval of 33 ms. Then, the control unit 208 causes the first retransmission request control packet to be transmitted to the reception apparatus 102, and causes the second retransmission request control packet to be transmitted to the reception apparatus 103.

Further, the control unit 208, when controlling, for example, by using the waiting time designation type, requests the RTCP generation unit 211 to generate a first retransmission request control packet which sets the waiting time to 5 ms, and a second retransmission request control packet which sets the waiting time to 20 ms.

Then, the control unit 208 causes the first retransmission request control packet to be transmitted to the reception apparatus 102, and the second retransmission request control packet to be transmitted to the reception apparatus 103. Further, the control unit 208 can also control by using the time listing type, transmission timings of the retransmission request made by the reception apparatus.

A multicast address is added to a destination address of a retransmission request packet which the reception apparatus according to the present exemplary embodiment transmits. Therefore, for example, when the reception apparatus 102 transmits a retransmission request packet of a first moving image packet, the retransmission request packet will be received by not only the transmission apparatus 101, but also the reception apparatuses 103 and 104.

Then, the reception apparatuses 103 and 104, upon receiving the retransmission request packet of the first moving image packet, do not transmit the retransmission request, even if the first moving image packet has not been normally received. With the above processing, retransmission request of the same moving image packet will be prevented from being transmitted in duplicate from the plurality of reception apparatuses.

Figure 9:
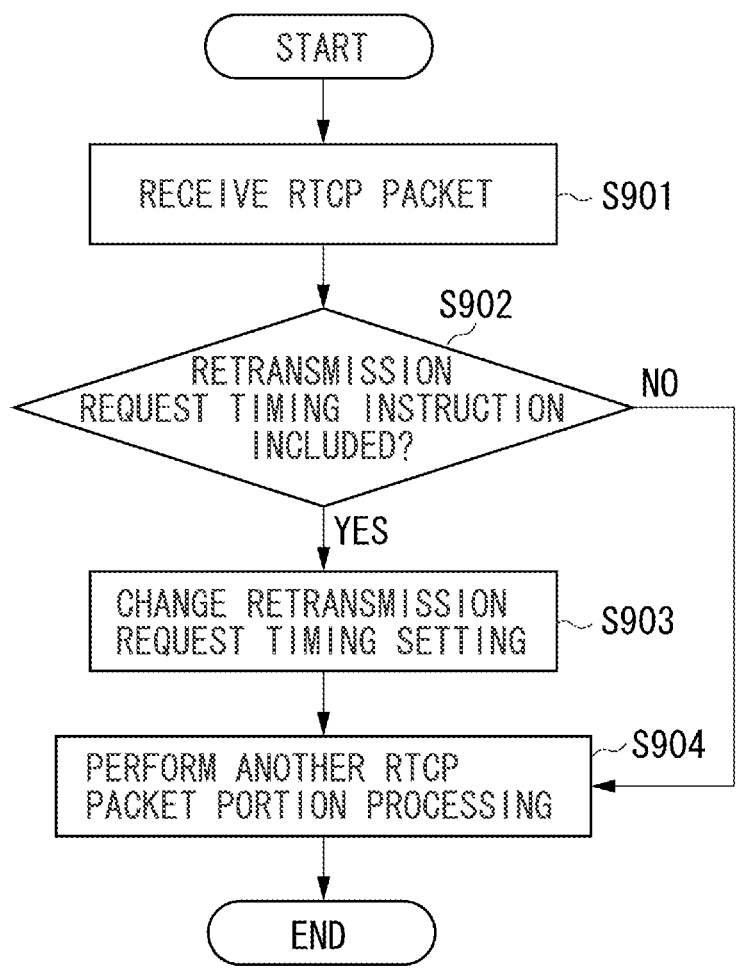
FIG. 9 is a flowchart illustrating processing for determining a transmission timing of a retransmission request in the reception apparatus.

Next, processing for controlling a transmission timing of the retransmission request by the reception apparatus will be described with reference to FIG. 9.

In step S901, the RTCP analysis unit 407 receives a RTCP packet from the transmission apparatus 101. Then, the RTCP analysis unit 407, if the RTCP packet is a retransmission request control packet, acquires a control signal for controlling the transmission timing of the retransmission request, and notifies the control unit 409.

In step S902, the control unit 409 determines whether information notified from the RTCP analysis unit 407 in step S901 is a control signal for controlling the transmission timing of the retransmission request.

Then, if it is determined that the information is a control signal for controlling the transmission timing of the retransmission request (YES in step S902), then the control unit 409 advances the processing to step S903. If it is determined that the information is not a control signal for controlling a transmission timing of the retransmission request (NO in step S902), the control unit 409 advances the processing to step S904.

In step S903, the control unit 409 changes setting of the transmission timing of the retransmission request, based on the control signal notified in step S901.

The control unit 409, for example, upon receiving a control signal of the interval type, sets the next transmission time point to a designated value, and sets the transmission interval of the retransmission request. In other words, the control unit 409 rewrites information relating to the transmission timing of the retransmission request stored in the session information storage unit 410, based on the notified control signal.

FIG. 10 is an example of a management table for managing the transmission timing of the retransmission request stored in the session information storage unit 410 according to the present exemplary embodiment.

As illustrated in FIG. 10, the management table includes a session number 1001, a timing designation system 1002, and a timing designation value of 1003. The reception apparatus according to the present exemplary embodiment manages the transmission timings of the retransmission requests for each session.

For example, the reception apparatus 102 receives the moving image data through the multicast from the transmission apparatus 101, based on a session of the session number 1. In addition, the reception apparatus 102 receives the moving image data from a transmission apparatus different from the transmission apparatus 101, based on a session of the session number 2.

Figure 11:
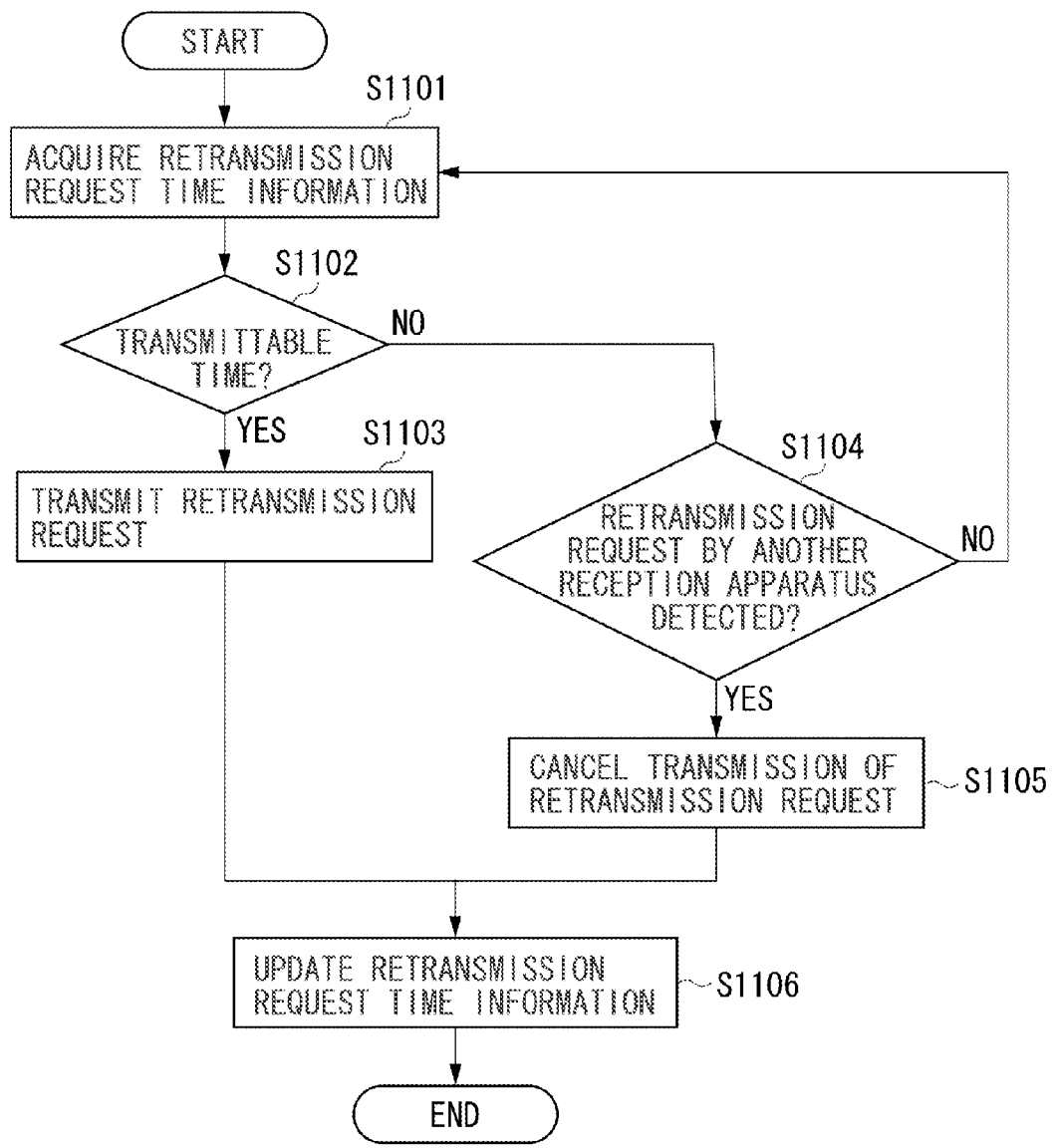
FIG. 11 is a flowchart illustrating transmission processing of the retransmission request by the reception apparatus.

Next, processing of the reception apparatus according to the present exemplary embodiment will be described with reference to FIG. 11. The processing of FIG. 11 is started by detecting a packet loss of the moving image data by the control unit 409.

In step S1101, the control unit 409 acquires from the session information storage unit 410 retransmission request time information for determining whether transmission of the retransmission request is permitted. If the timing designating system is of an interval type, the control unit 409 acquires a next transmission time point as the retransmission request time information from the session information storage unit 410, out of the timing designation values illustrated in FIG. 10.

The next transmission time may be a certain point of time, or may be also a time period having an allowance. If the timing designating system is of a waiting time designation type, the control unit 409 acquires a count value of the waiting time as the retransmission request time information from the session information storage unit 410.

In step S1102, the control unit 409 determines whether transmission of the retransmission request is permitted at present, based on the retransmission request time information acquired in step S1101. For example, in the case of the interval type, the control unit 409 determines that the transmission of retransmission request is permitted, if it is determined that the current time has reached the next transmission time.

In the case of the waiting time designation type, the control unit 409 determines that transmission of the retransmission request is permitted, if it is determined that a count value of the waiting time has reached a set waiting time.

If it is determined that transmission of the retransmission request is permitted (YES in step S1102), then the processing proceeds to step S1103. The control unit 409 causes the retransmission request to be transmitted to the transmission apparatus 101. On the other hand, if it is determined that transmission of the retransmission request is not permitted in step S1102 (NO in step S1102), then the processing proceeds to step S1104. In step S1104, the control unit 409 waits for the transmission of the retransmission request, and determines whether the retransmission request has been received from another reception apparatus.

If it is determined that the retransmission request has been received from another reception apparatus, in step S1104 (YES in step S1104), then the processing proceeds to step S1105. In step S1105, the control unit 409 cancels transmission of the retransmission request of the moving image data which corresponds to the received retransmission request.

For example, the control unit 409 of the reception apparatus 102, in response to the fact that retransmission request of a first packet has been received from the reception apparatus 103 which is currently receiving the same moving image data through multicast, cancels transmission of the retransmission request of the first packet in step S1105.

In this way, the transmission apparatus 101 according to the present exemplary embodiment performs control so that the transmission timings of the retransmission requests by the reception apparatuses 102 and 103, which share the bottle neck, do not coincide with each other, out of the reception apparatuses 102, 103, and 104 as transmission destinations of the same moving image data through multicast.

With the above processing, a possibility that retransmission requests of the same moving image packet are transmitted in duplicate from a plurality of reception apparatuses can be reduced. In addition, each of the reception apparatuses can transmit the retransmission request at an earlier timing, than controlled so that the transmission timings of the retransmission requests by all of the reception apparatuses 102, 103, and 104 as multicast transmission destinations do no coincide with one another.

In other words, the reception apparatus 104 which does not share the bottle neck with another reception apparatus, when detecting a packet loss of the moving image data, transmits the retransmission request without the need to set a waiting time shown in the present exemplary embodiment. As a result, the reception apparatus 104 can receive retransmitted data earlier.

However, it is also possible to perform control so that the transmission timings of the retransmission requests do not coincide with one another, for each of the reception apparatuses 102, 103, and 104 as transmission destinations of all multicast transmission.

If the control unit 409 causes the retransmission request to be transmitted in step S1103, or cancels the transmission of the retransmission request in step S1105, then the processing proceeds to step S1106. In step S1106, the control unit 409 updates retransmission request time information.

In the case that the timing designation system is of the interval type, the control unit 409 adds an interval value to the previous transmission time and the next transmission time, in step S1105. Then, in the case that the timing designation system is of a waiting time designation type, the control unit 409 resets a count value of the waiting time.

The reception apparatus 102 according to the first and second exemplary embodiments, can include instructions to the transmission apparatus 101, in the RTCP packet of the reception status information. For example, the communication quality reporting unit 412 of the reception apparatus 102 can include an instruction for switching the moving image data to be transmitted by the transmission apparatus 101 or an instruction for terminating transmission of the moving image data by the transmission apparatus 101, in an expansion region of the packets of the reception status information.

The reception apparatus 102 according to the present exemplary embodiment can transmit the reception status information which includes instructions to the transmission apparatus 101, regardless of the transmission timings of the reception status information designated from the transmission apparatus 101.

If the reception apparatus 102 transmits the reception status information which includes the instructions to the transmission apparatus 101, after the transmission timings of the reception status information have been designated, the reception apparatus 102 embeds dummy data in information relating to the reception status.

With the above processing, the transmission apparatus 101 can determine with good accuracy whether the reception statuses of the plurality of reception apparatuses correspond to one another, and the reception apparatuses can notify at an early timing the instructions to the transmission apparatus 101.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-025865 filed Feb. 8, 2010, which is hereby incorporated by reference herein in its entirety.

What is claimed is:

1. A communication apparatus that transmits data to a reception apparatus, the communication apparatus comprising:
   a reception unit configured to receive reception status information indicating reception status of data by the reception apparatus from the reception apparatus; and
   a transmission control unit configured to control transmission of the reception status information by the reception apparatus which is receiving data from the communication apparatus, according to the reception status information received by the reception unit, such that a first reception apparatus and a second reception apparatus of a plurality of reception apparatuses transmit the reception status information at a shorter interval while the first and second reception apparatuses are receiving data from the communication apparatus and the reception unit is receiving first reception status information from the first reception apparatus and is receiving second reception status information from the second reception apparatus in a case where a first reception status indicated by the first reception status information and a second reception status indicated by the second reception status information correspond to a higher error rate than a threshold error rate than in a case where the first and second reception statuses correspond to a lower error rate than the threshold error rate.

2. The communication apparatus according to claim 1, wherein the transmission control unit causes the first reception apparatus to transmit next reception status information at an earlier timing in a case where the first reception status corresponds to the higher error rate than the threshold error rate than in a case where the first reception status corresponds to the lower error rate than the threshold error rate.

3. The communication apparatus according to claim 1, wherein the transmission control unit causes the first and second reception apparatuses to transmit reception status information indicating reception statuses of a matching time period.

4. The communication apparatus according to claim 3, wherein the transmission control unit causes the first reception apparatus which has transmitted the first reception status information, and the second reception apparatus which has transmitted the second reception status information to transmit reception status information at a matching timing in a case where the second reception status corresponds to the first reception status.

5. The communication apparatus according to claim 4, wherein the transmission control unit determines a shorter transmission interval of the reception status information for the first and second reception apparatuses, wherein the shorter transmission interval is shorter than that before causing the first and second reception apparatuses to transmit the reception status information at the matching timing.

6. The communication apparatus according to claim 4, wherein, in a case where reception status information, which the transmission control unit has caused the first and second reception apparatuses to transmit at a matching timing, corresponds to each other, the transmission control unit causes the first and second reception apparatuses to alternately transmit the reception status information.

7. The communication apparatus according to claim 6, wherein the transmission control unit determines a transmission interval of reception status information for the first reception apparatus, and a transmission interval of reception status information for the second reception apparatus each longer than those before causing the first and second reception apparatuses to alternately transmit reception status information.

8. The communication apparatus according to claim 6, further comprising:
   an acquisition unit configured to acquire priority information of the plurality of reception apparatuses connected via a network; and
   a determination unit configured to determine a first transmission rate to the first reception apparatus, and a second transmission rate to the second reception apparatus, based on respective priority information of the first and second reception apparatuses of which reception status information correspond to each other, and reception statuses indicated by the received reception status information.

9. The communication apparatus according to claim 6, further comprising:
   a designation unit configured to designate a timing when transmission of retransmission request of error data is permitted, to the first and second reception apparatuses of which reception status information corresponds to each other.

10. A communication method for a communication apparatus that transmits data to a reception apparatus, the communication method comprising:
    receiving reception status information indicating reception status of data by the reception apparatus from the reception apparatus; and
    controlling transmission of reception status information by the reception apparatus that is receiving data from the communication apparatus, according to the received reception status information, such that a first reception apparatus and a second reception apparatus of a plurality of reception apparatuses transmit the reception status information at a shorter interval while the first and second reception apparatuses are receiving data from the communication apparatus and the receiving step is receiving first reception status information from the first reception apparatus and is receiving second reception status information from the second reception apparatus in a case where a first reception status indicated by the first reception status information and a second reception status indicated by the second reception status information correspond to a higher error rate than a threshold error rate than in case where the first and second reception statuses correspond to a lower error rate than the threshold error rate.

11. The method according to claim 10, wherein the controlling step causes the first reception apparatus to transmit next reception status information at an earlier timing in a case where the first reception status corresponds to the higher error rate than the threshold error rate than in a case where the first reception status corresponds to the lower error rate than the threshold error rate.

12. The method according to claim 10, wherein the transmission control step causes the first and second reception apparatuses to transmit reception status information indicating reception statuses of a matching time period.

13. The method according to claim 12, wherein the controlling step causes the first reception apparatus which has transmitted the first reception status information, and the second reception apparatus which has transmitted the second reception status information, to transmit reception status information at a matching timing in a case where the second reception status corresponds to the first reception status.

14. A non-transitory computer-readable storage medium for storing a program that causes a computer to execute a method to transmit data to a reception apparatus, the method comprising:

receiving reception status information indicating reception status of data by the reception apparatus from the reception apparatus; and controlling transmission of reception status information by the reception apparatus that is receiving data from the computer, according to the received reception status information, such that a first reception apparatus and a second reception apparatus of a plurality of reception apparatuses transmit the reception status information at a shorter interval while the first and second reception apparatuses are receiving data from the computer and the receiving step is receiving first reception status information from the first reception apparatus and is receiving second reception status information from the second reception apparatus in a case where a first reception status indicated by the first reception status information and a second reception status indicated by the second reception status information correspond to a higher error rate than a threshold error rate than in case where the first and second reception statuses correspond to a lower error rate than the threshold error rate.

15. The medium according to claim 14, wherein the controlling step causes the first reception apparatus to transmit next reception status information at an earlier timing in a case where the first reception status corresponds to the higher error rate than the threshold error rate than in a case where the first reception status corresponds to the lower error rate than the threshold error rate.

16. The medium according to claim 14, wherein the controlling step causes the first and second reception apparatuses to transmit reception status information indicating reception statuses of a matching time period.

17. The medium according to claim 16, wherein the controlling step causes the first reception apparatus which has transmitted the first reception status information, and the second reception apparatus which has transmitted the second reception status information, to transmit reception status information at a matching timing in a case where the second reception status corresponds to the first reception status.

* * * * *